(12) United States Patent
Liu et al.

(10) Patent No.: US 11,966,996 B2
(45) Date of Patent: Apr. 23, 2024

(54) COMPOSITE THREE-DIMENSIONAL BLOB TOOL AND METHOD FOR OPERATING THE SAME

(71) Applicant: Cognex Corporation, Natick, MA (US)

(72) Inventors: Gang Liu, Natick, MA (US); Ben R. Carey, Cambridge, MA (US); Nickolas J. Mullan, Ambler, PA (US); Caleb Spear, South Haven, MN (US); Andrew Parrett, Boston, MA (US)

(73) Assignee: Cognex Corporation, Natick, MA (US)

( * ) Notice: Subject to any disclaimer, the term of this patent is extended or adjusted under 35 U.S.C. 154(b) by 80 days.

(21) Appl. No.: 17/173,032

(22) Filed: Feb. 10, 2021

(65) Prior Publication Data

US 2021/0350495 A1 Nov. 11, 2021

Related U.S. Application Data

(60) Provisional application No. 62/972,114, filed on Feb. 10, 2020.

(51) Int. Cl.
  *G06T 7/507* (2017.01)
  *G06T 1/00* (2006.01)
  (Continued)

(52) U.S. Cl.
  CPC .......... *G06T 1/0014* (2013.01); *G06T 7/0004* (2013.01); *G06T 7/507* (2017.01);
  (Continued)

(58) Field of Classification Search
  CPC ................. G06T 7/0002–001; G06T 2207/30108–30164; G06T 7/50;
  (Continued)

(56) References Cited

U.S. PATENT DOCUMENTS 5,831,621 A * 11/1998 Pito ........................ G06T 17/00
  702/156
7,936,944 B2 * 5/2011 Sato .................... G06V 10/145
  382/173
(Continued)

FOREIGN PATENT DOCUMENTS

CN 1982841 A * 6/2007 ............. G01B 11/25
CN 109993046 A * 7/2019 ......... G06K 9/00791
(Continued)

OTHER PUBLICATIONS

Ali, Mohd Shadman Rashid, and Ankit Ramashanker Pal. "Multi machine operation with product sorting and elimination of defective product along with packaging by their colour and dimension with speed control of motors." ICEECCOT 2017. IEEE. (Year: 2017).*
(Continued)

*Primary Examiner* — Ian L Lemieux
(74) *Attorney, Agent, or Firm* — Loginov & Associates, PLLC; William A. Loginov (57) ABSTRACT

This invention provides a system and method that performs 3D imaging of a complex object, where image data is likely lost. Available 3D image data, in combination with an absence/loss of image data, allows computation of x, y and z dimensions. Absence/loss of data is assumed to be just another type of image data, and represents the presence of something that has prevented accurate data from being generated in the subject image. Segments of data can be connected to areas of absent data and generate a maximum bounding box. The shadow that this object generates can be represented as negative or missing data, but is not representative of the physical object. The height from the positive data, the object shadow size based on that height, the location in the FOV, and the ray angles that generate the
(Continued)

images, are estimated and the object shadow size is removed from the result.

19 Claims, 7 Drawing Sheets

(51) Int. Cl.
  *G06T 7/00* (2017.01)
  *G06T 7/521* (2017.01)
  *G06T 7/80* (2017.01)
  *G06V 20/64* (2022.01)

(52) U.S. Cl.
  CPC ............... *G06T 7/521* (2017.01); *G06T 7/85* (2017.01); *G06V 20/64* (2022.01); *G06T 2207/10028* (2013.01); *G06V 2201/12* (2022.01)

(58) Field of Classification Search
  CPC ... G06T 7/507; G06T 7/521; G06T 7/55–596; G06T 7/85; G06T 7/97; G06T 2207/10028; G06T 1/0014; G06T 7/60–68; G06T 7/70–77; G06V 20/64; G06V 20/647; G06V 20/653; G06V 2201/12; G06V 2201/121; G06K 9/00
  See application file for complete search history.

(56) References Cited

U.S. PATENT DOCUMENTS

| | | |
|---|---|---|
| 8,103,333 B2 | 1/2012 | Tran |
| 8,121,618 B2 | 2/2012 | Rhoads |
| 8,660,355 B2 | 2/2014 | Rodriguez |
| 9,367,770 B2 | 6/2016 | Footen |
| 9,372,160 B2 | 6/2016 | Nygaard |
| 9,504,420 B2 | 11/2016 | Davis |
| 10,113,910 B2 | 10/2018 | Brunk |
| 10,127,449 B2 | 11/2018 | Pestun |
| 10,319,080 B2 | 6/2019 | Kim |
| 10,346,687 B2 | 7/2019 | Pestun |
| 10,642,364 B2 | 5/2020 | Minnen |
| 10,695,150 B2 | 6/2020 | Kopelman |
| 2002/0186878 A1* | 12/2002 | Hoon ....................... G06T 7/586 382/154 |
| 2010/0007896 A1* | 1/2010 | Fishbaine .......... G01N 21/8806 356/603 |
| 2013/0182904 A1* | 7/2013 | Zhang ................ G08B 21/0476 382/103 |
| 2020/0209399 A1* | 7/2020 | Talapov .................. G01S 17/89 |
| 2020/0279084 A1 | 9/2020 | Davis |
| 2021/0278200 A1* | 9/2021 | Muotio ................ G01B 11/028 |

FOREIGN PATENT DOCUMENTS

| | | |
|---|---|---|
| JP | 2009115783 | 5/2009 |
| JP | 201242396 | 3/2012 |
| WO | 2005068936 | 7/2005 |
| WO | 2013005815 | 1/2013 |

OTHER PUBLICATIONS

Hinks Tommy et al., "Visualisation of urban airborne laser scanning data with occlusion images", ISPRS Journal of Photogrammetry and Remote Sensing, vol. 104, Jun. 1, 2015 (Jun. 1, 2015), pp. 77-87, XP055797294, Amsterdam, NL, ISSN: 0924-2716, DOI: 10.1016/j.isprsjprs.2015.01.014, Retrieved from the Internet: URL: https://www.sciencedirect.com/science/article/pii/S0924271615000325/pdfft?md5=b534b941df5682fe30d85eec02461418&pid=1-s2.0-S0924271615000325-main.pdf>.

Damm David, "Three dimensional occlusion mapping using a LiDAR sensor", Aug. 30, 2018 (Aug. 30, 2018), pp. 1-67, XP055797300, Retrieved from the Internet: URL: https://www.mi.fu-berlin.de/inf/groups /ag-ki/Theses/Completed-theses/Master Diploma-theses/2018/Damm/Masterarbeit-DDaMm.pdf.

Habib Ayman F. et al: "Occlusion-based Methodology for the Classification of Lidar Data", Jun. 1, 2009 (Jun. 1, 2009), pp. 703-712, XP055797303, Retrieved from the Internet: URL: https://www.asprs.org/wp-content/uploads/pers/2009journal/june/2009jun703-712.pdf [retrieved on Apr. 20, 2021].

\* cited by examiner

COMPOSITE THREE-DIMENSIONAL BLOB TOOL AND METHOD FOR OPERATING THE SAME

RELATED APPLICATION

This application claims the benefit of U.S. Provisional Application Ser. No. 62/972,114, entitled COMPOSITE THREE-DIMENSIONAL BLOB TOOL AND METHOD FOR OPERATING THE SAME, filed Feb. 10, 2020, the teaching of which are incorporated herein by reference.

FIELD OF THE INVENTION

This invention relates to machine vision systems that analyze objects in three-dimensional (3D) space, and more particularly to systems and methods for analyzing objects having complex shapes.

BACKGROUND OF THE INVENTION

Machine vision systems (also termed herein, "vision systems") that perform measurement, inspection, alignment of objects and/or decoding of symbology (e.g. bar codes—also termed "ID Codes") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities.

As described above, one or more vision system camera(s) can be arranged acquire two-dimensional (2D) or three-dimensional (3D) images of objects in an imaged scene. 2D images are typically characterized as pixels with an x and y component within an overall N×M image array (often defined by the pixel array of the camera image sensor). Where images are acquired in 3D, there is a height or z-axis component, in addition to the x and y components. 3D image data can be acquired using a variety of mechanisms/techniques, including triangulation of stereoscopic cameras, LiDAR, time-of-flight sensors and (e.g.) laser displacement profiling.

A typical problem that arises with 3D camera systems when performing measurements of a complex arrangement of similar or disparate items is that image data can be lost between objects arranged (e.g.) in a group. For example, a typical complex object is a pack of water bottles, where the cap of the water bottle is potentially one-half or less of the diameter of the bottle. The resulting image data, when observed with a 3D image sensor, derives generally from the caps—which are fully exposed at the top of the image height. However, useful image data (e.g. of the bottles and space between caps) is lost in between the caps. This can be due to shadows in illumination and the angle that light rays travel from the illuminator to the object, and back to the image sensor. In general, it is common that complicated objects such as water bottles, mirror-like surfaces, or small features of a certain spatial frequency can cause a loss of 3D data capture in a vision system. In the example of water bottles, the caps/tops typically provide a solid response of 3D image data, but the areas surrounding the caps may provide no useable image data due to the water/plastic/plastic wrap of the package muddying the optical feedback that normally generates a 3D image.

SUMMARY OF THE INVENTION

This invention overcomes disadvantages of the prior art by providing a system and method that performs 3D imaging of a complex object, where image data is likely lost. The system and method employs available 3D image data in combination with an absence/loss of image data, and can consider this overall set of present and absent image data as a single object, which allows for x, y and z dimensions to be accurately computed for this single object. In general, the absence/loss of image data is assumed by the system and method herein as just another type of data, and represents the presence of something that has prevented accurate 3D image data from being generated in the subject image. Using this assumption, segments of image data can be connected to areas of absent data and can thereby generate a maximum bounding box. In the case of a tall, complex object, the shadow that this object generates can also be represented as negative or missing data, but is not representative of the physical object. Using the height data from the positive data, the size of the shadow of the object based on that height, the location in the field of view, and the ray angles that generate the images, is estimated and removed from the result to provide a more accurate 3D image result.

In an illustrative embodiment, a composite 3D blob tool, and a method for operating the same, can be provided for a vision system. The vision system can have a processor that receives acquired 3D image data from an object using a 3D camera assembly. The tool and associated method can include a blob tool process that identifies positive 3D image data and negative 3D image data in the acquired 3D image data, and that combines the positive 3D image data that defines z-dimension height information and the negative 3D image data, so as to thereby define at least one connected object. The negative 3D image data can comprise, at least in part, orthogonal x-y dimensions that define an absence of data with respect to the object and a shadow with respect to the object. The z-dimension height information can be used to refine the x-y dimensions of the object based on: (1) knowledge of angles of rays projected by illumination associated with the 3D camera assembly and received by an image sensor of the 3D camera assembly and (2) the location of the object in the field of view of the image sensor, so that a contribution of the shadow to the object is altered based on the refined x-y dimensions of the object. Illustratively, the blob tool process can analyze the connected object for spatial significance of the acquired 3D image data based upon calibration information in the 3D camera assembly. The object can comprise at least one of (a) plurality of side by side objects each having tops of approximately a similar height and (b) one or more objects having top surfaces respectively defining a plurality of differing heights. The 3D camera assembly can comprise at least one of a stereo camera, structured illumination-based camera, time-of-flight-based camera and profiler. The shadow and positive 3D image data can define a bounding box that contains both the shadow and the positive 3D image data residing above reference surface. Illustratively, the reference surface can define a conveyor surface upon which the object resides. The object can be a package, and results of the 3D blob tool are provided to a gating assembly of the conveyor that directs the object to one of a plurality of differing destinations based upon features of the object. The features can indicate a defective object, which is thereby directed by the gated conveyor to a defective and/or rejected object location.

BRIEF DESCRIPTION OF THE DRAWINGS

The invention description below refers to the accompanying drawings, of which.

DETAILED DESCRIPTION

I. System Overview

Figure 1:
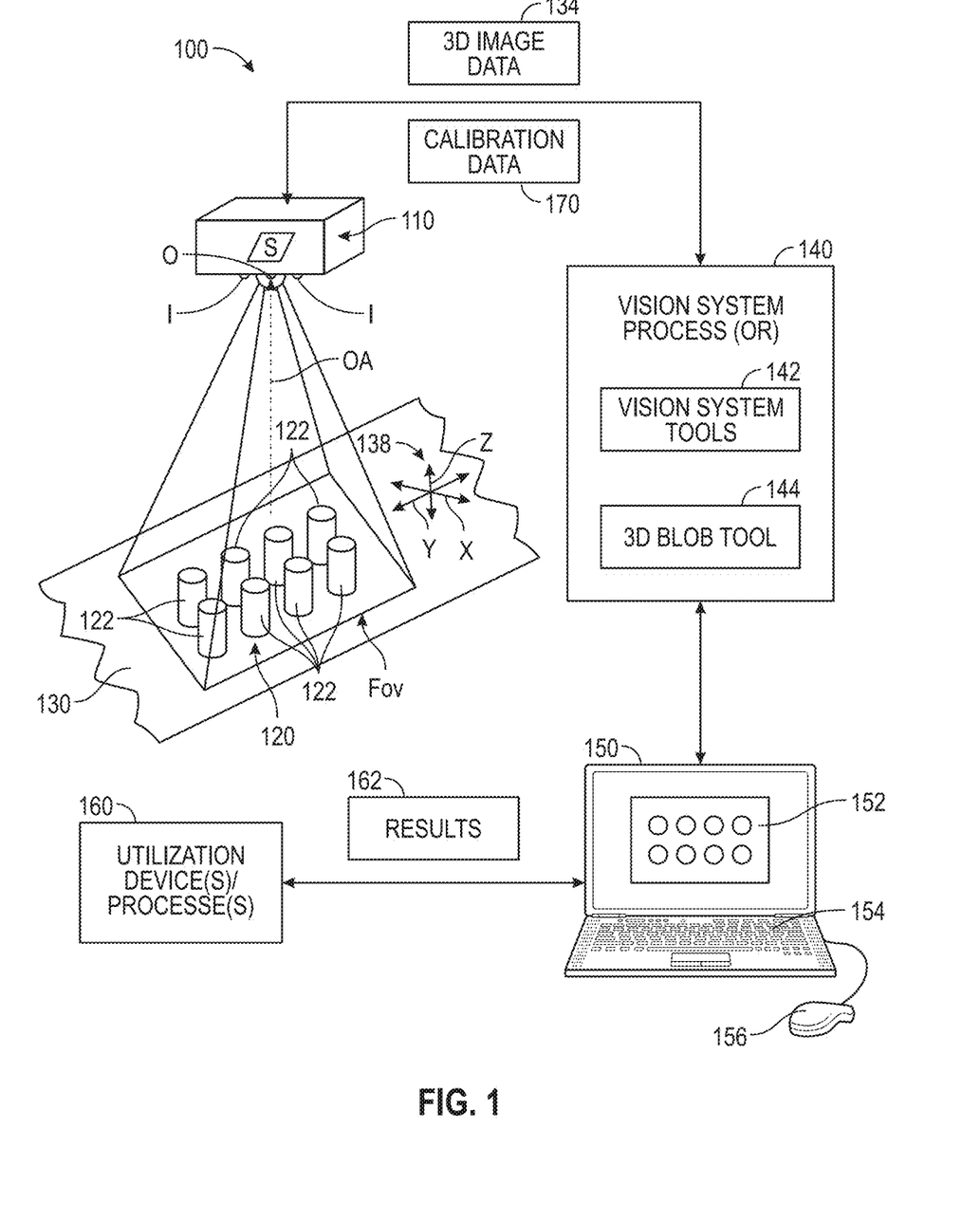
FIG. 1 is an overview of a system for acquiring and processing 3D images of complex objects, which employs a composite 3D blob tool to provide predictions of image missing data.

FIG. 1 shows an overview of an arrangement 100 in which a vision system camera assembly (also termed simply "camera" or "sensor") 110 acquires 3D image data of exemplary, grouping 120, of objects 122 as they pass beneath its field of view (FOV) with respect to a moving conveyor 130. In this example, the objects 122 are a group 120 of jars or bottles arranged in a group—for example within a crate or shrink-wrapping. It should be noted that any arrangement of objects, or a single object with a complex top surface, can be imaged and analyzed according to the system and method herein.

The 3D camera/imaging assembly 110 contemplated can be any assembly that acquires 3D images of objects including, but not limited to, stereo cameras, time-of-flight cameras, LiDAR, ultrasonic range-finding cameras, structured illumination systems, and laser-displacement sensors (profilers), and thus, the term 3D camera should be taken broadly to include these systems and any other system that generates height information in association with a 2D image of an object. Also, a single camera, or an array of a plurality of cameras, can be provided, and the terms "camera" and/or "camera assembly" can refer to one or more cameras that acquire image(s) in a manner that generates the desired 3D image data for the scene. The depicted camera assembly 110 is shown mounted overlying the surface of the conveyor 130 in the manner of a checkpoint or inspection station that images the flowing objects as they pass by. The objects 122 can remain in motion or stop momentarily for imaging, depending upon the operating speed of the conveyor and acquisition time for camera image sensor (S) and related electronics (depending, in part, upon frame rate and aperture settings) 110. In alternate embodiments a conveyor can be omitted and the objects can be located on a non-moving stage or surface. By way of non-limiting example, the camera 110 defines an optical axis OA that is approximately perpendicular with respect to the surface of the conveyor 130. The camera axis OA can alternatively be oriented at a non-perpendicular angle with respect to the surface of the conveyor in alternate arrangements. The camera's calibration can translate between the internal coordinate system and the coordinate system of the imaged scene. Note that the local x, y and z axes (or other coordinate system) 138 are depicted by way of reference. In this example, the plane of the conveyor surface represents the x-y dimensions, and the height perpendicular to the conveyor surface represents the z-dimension.

The camera 110 includes an image sensor S that is adapted to generate 3D image data 134 internal to its housing. The camera assembly includes an integral illumination assembly I, (for example a ring illuminator of LEDs that projects light in a predictable direction with respect to the axis OA. External illumination (not shown) can be provided in alternate arrangements. An appropriate optics package O is shown in optical communication with the sensor S, along the axis OA. The sensor S communicates with an internal and/or external vision system process(or) 140 that receives image data 134 from the camera 110, and performs various vision system tasks upon the data in accordance with the system and method herein. The process(or) 140 includes underlying processes/processors or functional modules, including a set of vision system tools 142, which can comprise a variety of standard and custom tools that identify and analyze features in image data, including, but not limited to, edge detectors, blob tools, pattern recognition tools, deep learning networks, etc. The vision system process(or) 140 can further include a dimensioning process(or) 144 in accordance with the system and method. This process(or) 144 performs various analysis and measurement tasks on features identified in the 3D image data so as to determine the presence of specific features from which further results can be computed. The process(or) uses a variety of conventional and custom (e.g. 3D) vision system tools 142, which includes the 3D blob tool 144 according to the exemplary embodiment. System setup and results display can be handled by a separate computing device 150, such as a server (e.g. cloud-based or local), PC, laptop, tablet and/or smartphone. The computing device 150 is depicted (by way of non-limiting example) with a conventional display or touchscreen 152, keyboard 154 and mouse 156, which collectively provide a graphical user interface (GUI) functionality. A variety of interface devices and/or form factors can be provided in alternate implementations of the device 150. The GUI can be driven, in part, by a web browser application, which resides over a device operating system and displays web pages with control and data information from the process(or) 140 in accordance with an exemplary arrangement herein.

Note that the process(or) 140 can reside fully or partially on-board the housing of the camera assembly 110, and various process modules/tools 142 and 144 can be instantiated entirely or partially in either the on-board process(or) 140 or the remote computing device 150 as appropriate. In an exemplary embodiment, all vision system and interface functions can be instantiated on the on-board process(or) 140, and the computing device 150 can be employed primarily for training, monitoring and related operations with interface web pages (e.g. HTML) generated by the on-board-process(or) 140 and transmitted to the computing device via a wired or wireless network link. Alternatively, all or part of the process(or) 140 can reside in the computing device 150. Results from analysis by the processor can be transmitted to a downstream utilization device or process 160. Such device/process can use results 162 to handle objects/packages—for example gating the conveyor 130 to direct objects to differing destinations based upon analyzed features and/or rejecting defective objects.

II. Exemplary Images and Problem

Figure 2:
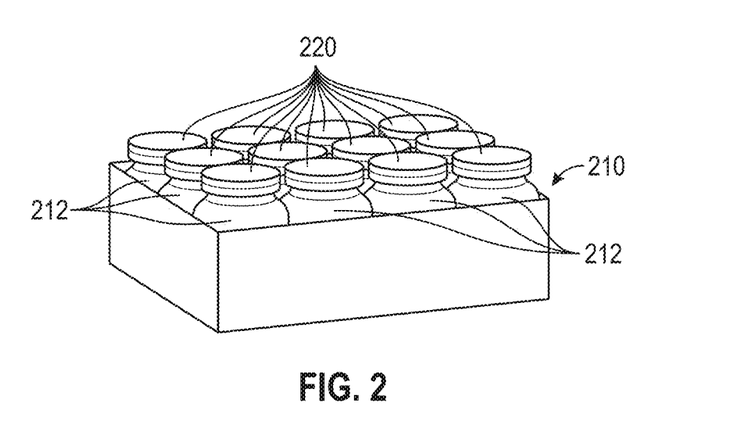
FIG. 2 is perspective view of an exemplary group of objects subject to absence of image data due to shadows and other effects that can be imaged and analyzed with the illustrative, composite 3D blob tool herein.
Figure 3:
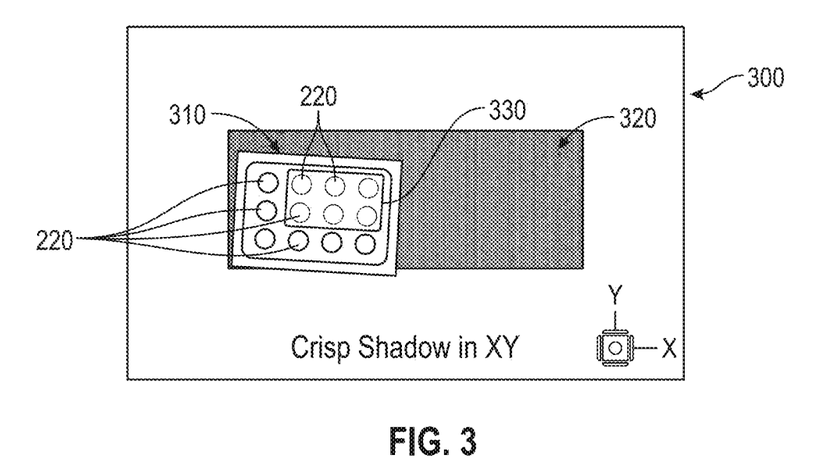
FIG. 3 is a diagram of a representation of a 3D point cloud image of the objects in FIG. 2 showing image data along an x-y plane of the image with associated absence of image data.
Figure 4:
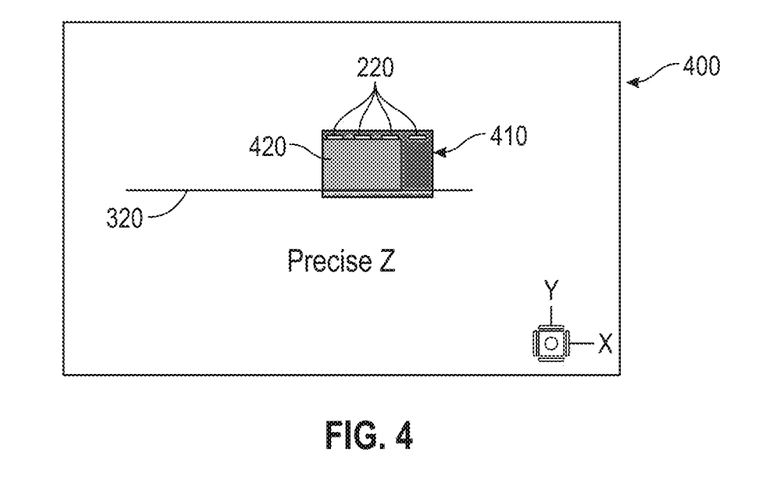
FIG. 4 is a diagram of the representation of FIG. 3 showing a relatively precise measurement of height along the z-dimension.
Figure 5:
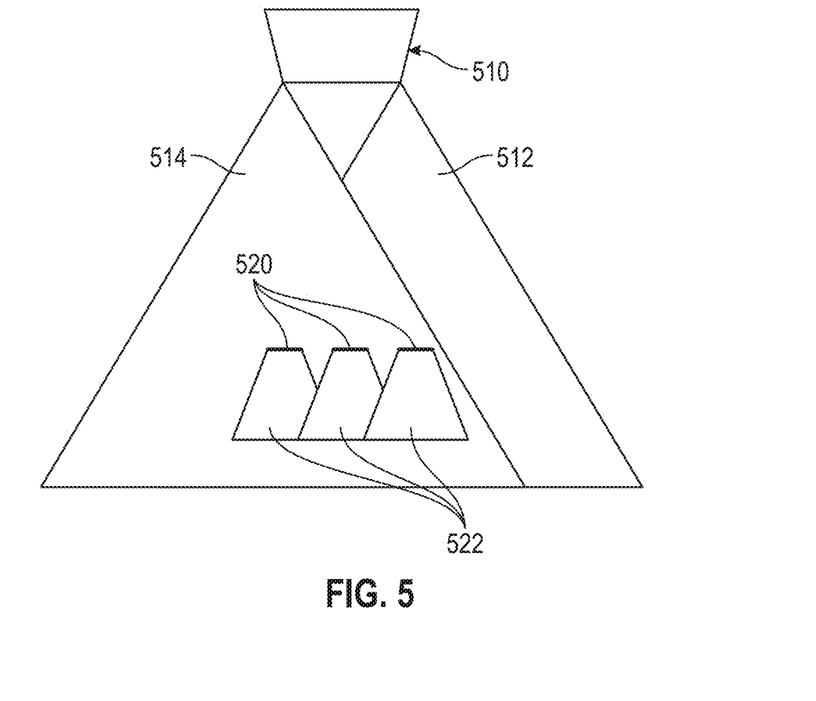
FIG. 5 is a diagram showing positioning of a 3D camera assembly over a group of objects and the potential for generation of shadows and resulting absence of image data.
Figure 6:
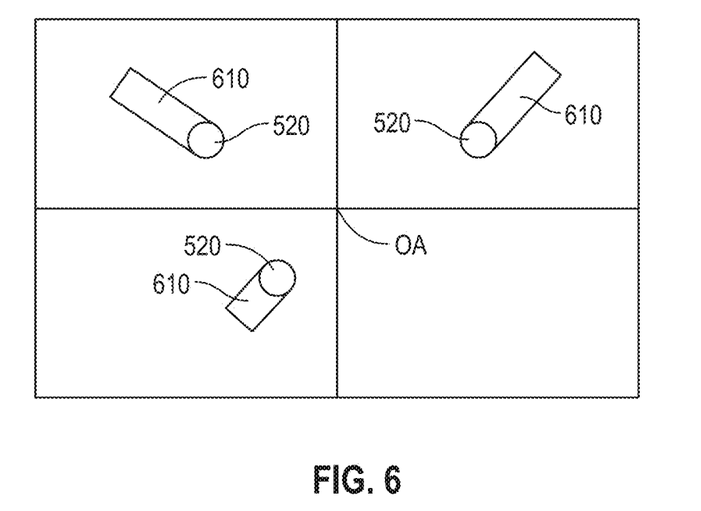
FIG. 6 is a top-down view of the image acquired by the camera assembly of FIG. 5 showing shadows of respective of the objects in each of differing directions, and differing sizes.

FIG. 2 further depicts an exemplary runtime object, or group of objects 210—in this non-limiting example, a crate of jars or bottles defining glass bodies 212 and overlying tops or caps 220. An exemplary (e.g. 3D point cloud) display representation of this object, from an overlying 3D camera assembly of the type shown in FIG. 1, is shown in FIGS. 3 and 4. In particular, FIG. 3, shows a display representation 300, in which the jar tops 220 are imaged along an X-Y plane. The tops 220 are bounded by an appropriately sized bounding box that can be defined based upon a height difference from the surrounding conveyor surface 320. An area of interest (rectangle 330) shows various tops obscured by shadows and other data (jar bodies below the caps), which makes it difficult for vision system tools, such as edge finders, to resolve individual caps. Conversely, the overall height data for the same region (rectangle 420 within outer bounding box 410) is shown in the display representation 400 of FIG. 4, and defines a fairly precise measurement along the Z-direction/dimension. By way of further illustration, the camera assembly 510, shown in FIG. 5 generates a projected illumination fan 512 that is received as reflected light 514 (at an offset due to placement of illumination and optical components) by the camera assembly in a manner that generates a series of outwardly fanned shadows 522 from the tops (caps) 520 that overlap and obscure a resulting 2D image of the scene. As shown in the top view of FIG. 6, each top 520 can display a unique size/shape shadow that is also biased in a discrete direction 520 bases upon the relative position of the top in the scene compared to the angle of illumination and the optical axis OA. This adds to the complexity and uncertainty in the overall image.

Figure 7:
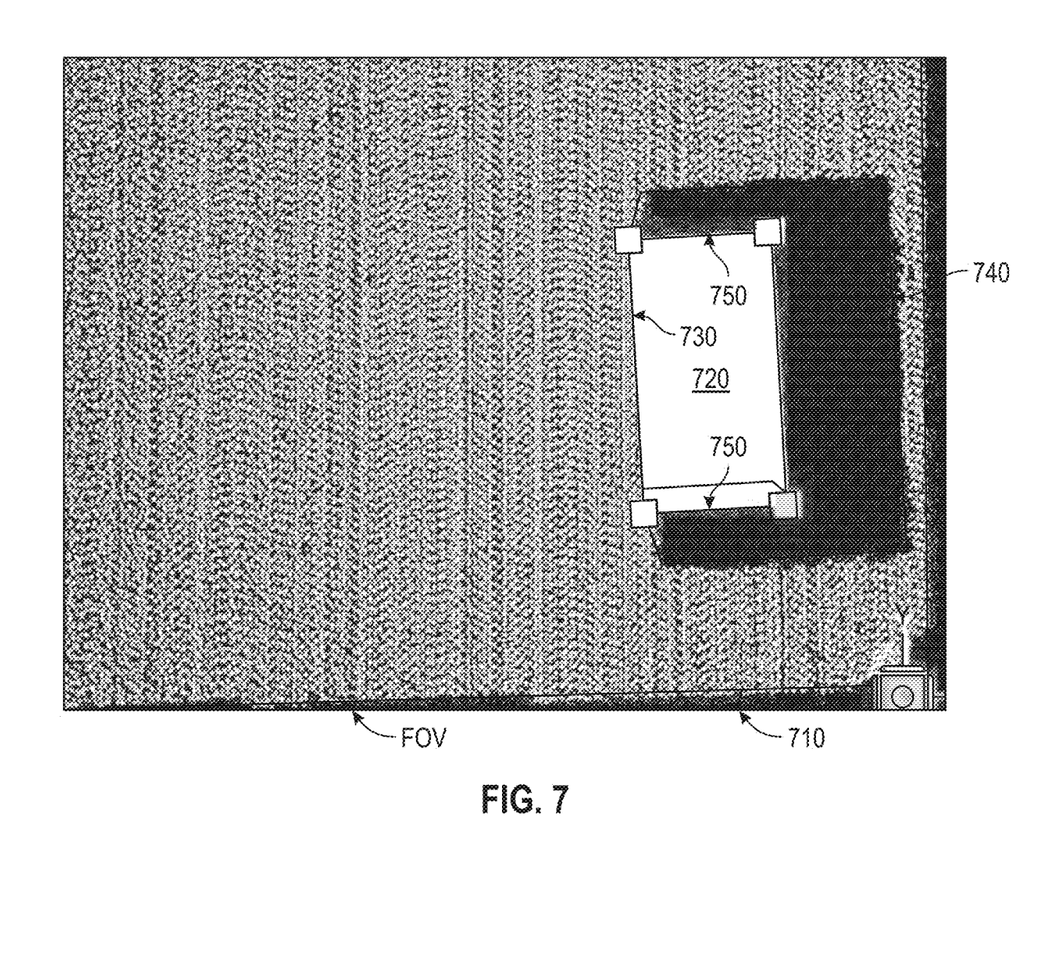
FIG. 7 is a diagram of a representation of a 3D point cloud image of a basic rectangular object residing near an edge of the camera assembly FOV, showing the projection and orientation of shadows.
Figure 8:
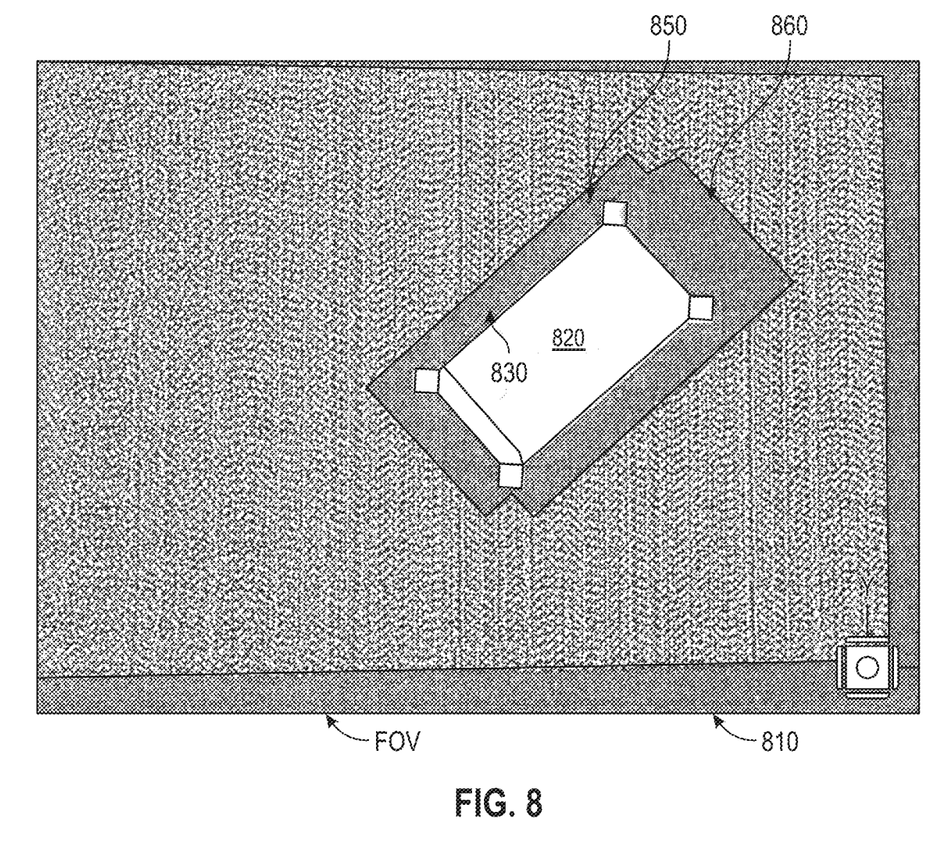
FIG. 8 is a diagram of a representation of a 3D point cloud image of a basic rectangular object of FIG. 7 residing closer to the middle of the camera assembly FOV, showing a more complex projection and orientation of shadows.

With even further reference to FIG. 7, a depicted 3D display representation 710, in a top-down view, of a basic rectangular object 720 shows the challenge to resolving shapes where the object 720 is far enough to one edge of the FOV, that there is no shadow on one side 730, a deep shadow on one (opposing) side 740, and two shallow shadows 750. Similarly, the representation 810 of FIG. 8 shows a basic object 820 (also rectangular, in a top-down view). This object 820 is closer to the center of the FOV and slightly rotated with respect to object 720 in FIG. 7. In this representation, the object 820 defines an overall shadow 830 with eight (8) corners, including a four-corner shadow 850 from the illumination projector overlapped with four-corner shadow 860 from the camera. The existence of complex shadows that vary depending upon location in the field of view, etc. makes resolution of features challenging using 2D image data, even combined with raw height data, as some height data may be missing due to the shadows. However, height data that is available, can be fairly precise as discussed above.

III. Blob Tool and Method of Operation

Figure 9:
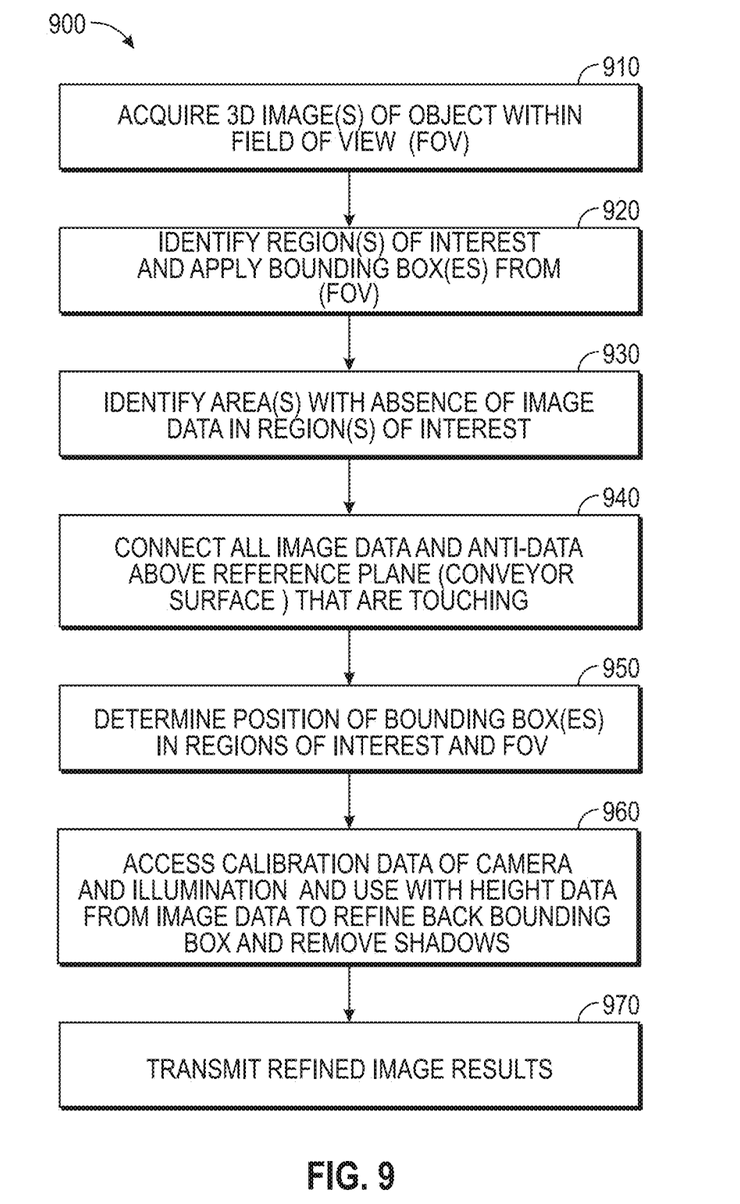
FIG. 9 is a flow diagram of the procedure steps for operating the composite 3D blob tool according to an illustrative embodiment.

FIG. 9 is a flow diagram showing a procedure 900 according to an exemplary embodiment. One or more 3D images are acquired by the camera assembly of an object, or group of objects, within the field of view (FOV) in step 910. Using this 3D image data, one or more region(s) of interest—for example areas where the height data is above the reference plane (e.g. the conveyor surface) and further bounding regions (boxes) are placed around object(s) in such region(s) of interest in step 920. In step 930, areas having an absence of image data (also termed "anti-data") in the region(s) of interest are identified. This can be accomplished in various ways using (e.g. segmentation tools and/or other appropriate vision system tools that are known to those of skill. Generally, they are areas where a height value and/or x-y pixel value is absent. Notably, the procedure 900 then uses the absence of image data to indicate connectivity and/or shadowing. Thus, in step 940, the procedure connects all data (above the reference plane) and all anti-data that are touching. The procedure then determines the position of the bounding box(es) in the region(s) of interest in step 950. This gives a relative reference to where the object is in the overall FOV. Based upon calibration data 170 in FIG. 1) stored in the camera assembly (during a factory calibration step and/or field calibration at setup), the procedure understands the (stored) path of light rays from the illuminator back to the camera for each point in the FOV at varying heights. Thus, based upon this data and the location of the bounding box in the FOV, along with height data for each point in the bounding box, the procedure can refine back the bounding box to remove shadows from the subject image data (step 960). This entails following the path of the expected rays in the connected shapes and mapping them to known heights in the image data. The results of this computation can be transmitted as refined image data to a downstream utilization process—for example a further vision system tool that performs dimensioning, inspection, etc.—in step 970.

IV. Differing Height (Multilevel) Objects

Figure 10:
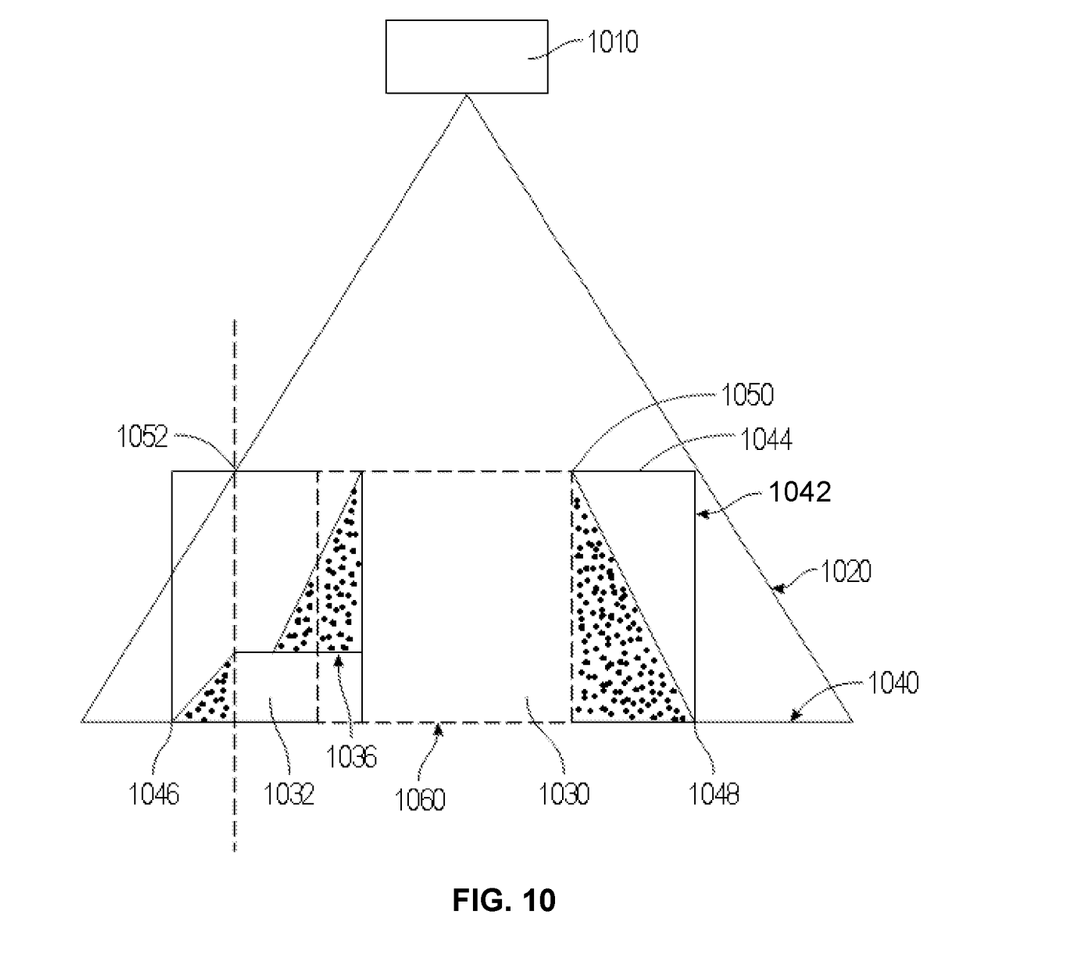
FIG. 10 is a diagram showing the creation of bounding boxes by the composite 3D blob tool of the illustrative embodiment to determine features in a multilevel object, or group of objects.

FIG. 10 is a diagram showing a camera assembly 1010 acquiring an image within its FOV 1020 of a plurality of objects, or different parts of the same object, 1030 and 1032 of differing height—which are relatively adjacent to each other in this example. Note that the maximum height of expected objects is preprogrammed by the user, and they reside fully within the FOV in this example (as shown). It is further assumed that the subject objects 1030, 1032 are relatively cuboidal in shape. This assumption can be validated by observing the quality and shape of all top surface (1034 and 1036) points of the item before commencing any correction.

In a first step, using missing point data caused by the shadow along with any observed data, generate the smallest bounding box 1042 that contains both the shadow and any observed data that lies above the reference surface A (e.g.

conveyor surface 1040). Next, using the first bounding box 1042, generate a plane A that coincides with the top-most surface 1044 of the bounding box 1042. Then, from each corner/vertex (v[i]) (1046 and 1048) of the bounding box 1042 that lies on the reference surface 1040, perform the following steps:
  a. Project v[i] along a ray to the illumination source, and determine the intersection point (Point B) where the ray intersects the top plane that coincides with surface 1044, as well as the distance (Distance B) between Point A and Point B;
  b. Project v[i] along a ray to the imager, and determine the intersection point (Point C) where the ray intersects the plane coinciding with top-most surface 1044, as well as the distance (Distance C) between Point A and Point C;
  c. Obtain the vertex (u[i]) of Box A on top-most surface 1044 directly above v[i] (which lies on Surface A);
  d. Compare Distance B and Distance C; whichever is greater, examine the corresponding point (Point B or Point C) and determine if it lies within top-most surface 1044;
    i. If yes, create a new point u'[i] that corresponds to that point (Point B or Point C); and
    ii. If no, create a new point u'[i] that corresponds to u[i].

The resulting upper vertices u'[ ] 1050 and 1052 should form essentially a rectangular shape that represents the corrected shadow; optionally, apply a best-fit rectangle to these vertices and generate a final corrected box by projecting the rectangle down to Surface A (1040).

Note that a perfectly square bounding box 1060 affords an incorrect estimation of the geometry as it bisects the upper shadow and the lower box 1032. Hence the initial box 1042 is drawn in an elongated manner to encompass the entire structure above the reference plane 1040.

V. Conclusion

It should be clear that the above-described system and method can effectively provide absent image data in 3D images where the characteristics of the geometry and illumination of the camera assembly are known. This system and method works effectively on adjacent, spaced apart objects and objects defining differing heights or differing-height portions.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). By way of non-limiting example, where the 3D camera comprises a line-scanning-type of assembly (e.g. a profiler) an encoder or other motion sensing device is used in conjunction with the imager to build the y-dimension, line-by-line, for a complete 3D image of the FOV. Accordingly, this description is meant to be taken only by way of example, and not to otherwise limit the scope of this invention.

What is claimed is:

1. A composite 3D blob tool for a vision system having a processor that receives acquired 3D image data from an object using a 3D camera assembly, the composite 3D blob tool comprising:
  a blob tool process, stored in a computer memory accessible by the processor, that identifies positive 3D image data and negative 3D image data in the acquired 3D image data, and that combines the positive 3D image data from the acquired 3D image data that defines z-dimension height information and the negative 3D image data from the acquired 3D image data so as to thereby define at least one connected object,
  wherein the negative 3D image data from the acquired 3D image data comprises, at least in part, a region of the acquired 3D image data with orthogonal x-y dimensions that define an absence of data with respect to the object and a shadow with respect to the object, and
  wherein the z-dimension height information is used to refine the x-y dimensions of the object based on: (1) predetermined projection angles of illumination associated with the 3D camera assembly and received by an image sensor of the 3D camera assembly and (2) the location of the object in the field of view of the image sensor, so that a contribution of the shadow to the object is altered based on the refined x-y dimensions of the object.

2. The composite 3D blob tool as set forth in claim 1, wherein the blob tool process analyzes the connected object for spatial significance of the acquired 3D image data based upon calibration information in the 3D camera assembly.

3. The composite 3D blob tool as set forth in claim 1 wherein the object comprises at least one of (a) plurality of side by side objects each having tops of approximately an equal height or (b) one or more objects having top surfaces respectively defining a plurality of differing heights.

4. The composite 3D blob tool as set forth in claim 1 wherein the 3D camera assembly comprises at least one of a stereo camera, structured illumination-based camera, time-of-flight-based camera or profiler.

5. The composite 3D blob tool as set forth in claim 1 wherein the shadow and the positive 3D image data define a bounding box that contains both the shadow and the positive 3D image data residing above a reference surface.

6. The composite 3D blob tool as set forth in claim 5 wherein the reference surface defines a conveyor surface upon which the object resides.

7. The composite 3D blob tool as set forth in claim 6 wherein the object is a package and results of the 3D blob tool are provided to a gating assembly of the conveyor that directs the object to one of a plurality of differing destinations based upon features of the object.

8. The composite 3D blob tool as set forth in claim 1, wherein a portion of the shadow with respect to the object defines at least a portion of positive z-dimension height information of an object in the acquired 3D image.

9. A method for operating a 3D blob tool for a vision system having a processor that executes the 3D blob tool, the method comprising the steps of:
providing a 3D image data of an object acquired using a 3D camera assembly;
identifying positive 3D image data and negative 3D image data in the acquired 3D image data and combing the positive 3D image data and the negative 3D image data;
defining at least one connected object based on the combined image data and analyzing the connected object for spatial significance of the acquired 3D image data based upon calibration information in the 3D camera assembly,
wherein the positive 3D image data defines z-dimension height information, and the negative 3D image data in the acquired 3D image data comprises, at least in part, a region of the acquired 3D image data with orthogonal x-y dimensions that define an absence of data with respect to the object and defines a shadow with respect to the object; and
refining the x-y dimensions of the object using the z-dimension height information, and based on predefined projection angles of illumination associated with the 3D camera assembly and received by an image sensor of the 3D camera assembly, and the location of the object in the field of view, so that a contribution of the shadow to the object is thereby removed.

10. The method as set forth in claim 9 wherein the object comprises at least one of (a) plurality of side by side objects each having tops of approximately an equal height or (b) a one or more objects having top surfaces respectively defining a plurality of differing heights.

11. The method as set forth in claim 9 wherein the 3D camera assembly comprises at least one of a stereo camera, structured illumination-based camera, time-of-flight-based camera or profiler.

12. The method as set forth in claim 9, further comprising, defining, with the shadow and the positive 3D image, a bounding box that contains both the shadow and the positive 3D image data residing above a reference surface.

13. The method as set forth in claim 12 wherein the reference surface defines a conveyor surface upon which the object resides.

14. The method as set forth in claim 13 wherein the object is a package, and further comprising, gating the conveyor to direct the object to one of a plurality of differing destinations based upon features of the object.

15. The method as set forth in claim 14 further comprising, identifying defects in the object and gating the conveyor to direct the object to a rejection destination.

16. The method as set forth in claim 9, wherein a portion of the shadow with respect to the object defines at least a portion of positive z-dimension height information of an object in the acquired 3D image.

17. A method comprising:
identifying with a processor, in an acquired 3D image data set, a first subset of the acquired 3D image data set that defines z-dimension height information of one or more objects, and second subset of the acquired 3D image data set that defines a region of the acquired 3D image data set with orthogonal x-y dimensions that define an absence of data with respect to a first object of the one or more objects and a shadow that defines at least a portion of z-dimension height information of the first object; and
refining with the processor x-y dimensions of the one or more objects in the acquired 3D image data set based on; (i) the z-dimension height information defined by the positive 3D image data, (ii) predefined projection angles of illumination associated with the 3D camera assembly received by an image sensor of a 3D camera assembly, (iii) a contribution of the shadow to the x-y dimensions of the one or more objects, and (iv) a location in the acquired 3D image data set of the one or more objects in a field of view of the 3D camera assembly.

18. The method as set forth in claim 17, wherein the processor determines spatial significance of the acquired 3D image data set based on analysis of a connected object comprising the first subset and the second subset of the 3D image data set and calibration information in the 3D camera assembly.

19. The method as set forth in claim 17, wherein at least one object of the one or more objects is a package and results of refining the x-y dimensions of the one or more objects are provided to a gating assembly of a conveyor that directs the package to one of a plurality of differing destinations based upon features of the package.

* * * * *